United States Patent
Musgrove et al.

(10) Patent No.: US 12,224,475 B2
(45) Date of Patent: Feb. 11, 2025

(54) INTEGRATED THICK FILM SPACER FOR RF DEVICES

(71) Applicant: Raytheon Company, Tewksbury, MA (US)

(72) Inventors: Keely M. Musgrove, Allen, TX (US); Mark B. Hanna, Allen, TX (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 18/536,908

(22) Filed: Dec. 12, 2023

(65) Prior Publication Data

US 2024/0113407 A1   Apr. 4, 2024

Related U.S. Application Data

(62) Division of application No. 17/154,255, filed on Jan. 21, 2021, now Pat. No. 11,881,610.

(51) Int. Cl.
| | |
|---|---|
| H01P 1/387 | (2006.01) |
| B32B 7/12 | (2006.01) |
| B32B 15/04 | (2006.01) |
| B32B 37/12 | (2006.01) |
| B32B 38/00 | (2006.01) |
| B41M 1/12 | (2006.01) |
| H01P 1/36 | (2006.01) |
| H01P 1/38 | (2006.01) |
| H01P 11/00 | (2006.01) |

(52) U.S. Cl.
CPC .................. *H01P 1/38* (2013.01); *B32B 7/12* (2013.01); *B32B 15/04* (2013.01); *B32B 37/12* (2013.01); *B32B 38/145* (2013.01); *B41M 1/12* (2013.01); *H01P 1/36* (2013.01); *H01P 1/387* (2013.01); *H01P 11/00* (2013.01); *H01P 11/003* (2013.01); *B32B 2255/06* (2013.01); *B32B 2307/20* (2013.01); *B32B 2457/00* (2013.01)

(58) Field of Classification Search
CPC .. H01P 1/387; H01P 1/383; H01P 1/38; H01P 1/36; H01P 1/32; H01P 11/003; H01P 11/001; H01P 11/00; H01P 11/007; H01P 11/008

See application file for complete search history.

(56) References Cited

U.S. PATENT DOCUMENTS

| | | |
|---|---|---|
| 6,844,789 B2 | 1/2005 | Lombardi et al. |
| 7,280,004 B2 | 10/2007 | Kroening |
| 8,624,329 B2 | 1/2014 | Lee et al. |
| 9,531,050 B2 | 12/2016 | Kroening et al. |
| 11,881,610 B2 * | 1/2024 | Musgrove ............ H01P 11/003 |
| 2017/0256836 A1 | 9/2017 | Rajendran et al. |
| 2021/0050133 A1 | 2/2021 | Hill et al. |
| 2022/0181760 A1 | 6/2022 | Macfarlane et al. |
| 2022/0231393 A1 | 7/2022 | Musgrove et al. |

* cited by examiner

*Primary Examiner* — Stephen E. Jones
(74) *Attorney, Agent, or Firm* — CANTOR COLBURN LLP

(57) ABSTRACT

A method of fabricating a portion of magnetically controlled signal distribution device includes receiving a substrate and screen printing a low-k dielectric spacer over an upper surface of the surface from a low-k dielectric paste. The method also includes firing the substrate after the spacer has been screen printed thereon, forming an adhesive layer on top of the spacer and securing a magnet to a top of the adhesive layer.

6 Claims, 3 Drawing Sheets

INTEGRATED THICK FILM SPACER FOR RF DEVICES

CROSS REFERENCE TO RELATED APPLICATION

This application is a division of U.S. application Ser. No. 17/154,255 filed Jan. 21, 2021, the disclosure of which is incorporated by reference herein in its entirety.

BACKGROUND

The present disclosure relates to radio frequency (RF) devices and, in particular, magnetically controlled RF signal distribution devices.

As is known in the art, feed structures are used to couple a radar or communication system to an array of antenna elements. Examples of feed structures used in such systems include circulators and isolators.

Circulators are composed of a ferrite substrate with a magnet mounted on top of patterned metallization. The device also has a spacer composed of a low dielectric constant material and that is mounted between the magnet and the substrate. The purpose of the spacer is to control the strength and spread of the magnetic field created by the magnet relative to the metallization, define RF bandwidth, and to isolate the magnet from the metallization (e.g., conductive circuit pattern). The critical properties of the spacer include thickness control and dielectric constant. The lower the dielectric constant, the thinner the required spacer. The uniformity of the spacer thickness also improves the uniformity of the magnetic field. Isolators are special purpose circulators that have one terminal attached to matched load.

SUMMARY

Disclosed herein are methods of fabricating a portion of magnetically controlled signal distribution device. In one embodiment, the method includes: receiving a substrate; screen printing a low-k dielectric spacer over an upper surface of the surface from a low-k dielectric paste; firing the substrate after the spacer has been screen printed thereon; forming an adhesive layer on top of the spacer; and securing a magnet to a top of the adhesive layer.

In any prior method, metal traces can be formed on the upper surface of the substrate.

In any prior method, the low-k dielectric spacer can be screen printed directly on top of the metal traces.

In any prior method, the low-k dielectric spacer can be screen printed directly on top of the upper surface.

In any prior method, the substrate is a wafer and screen printing includes screen printing a plurality of spacers at different locations on the upper surface.

Any prior method can further include dicing the wafer to form a plurality of magnetically controlled signal distribution devices.

In any prior method, the substrate can include a ground plane on a side opposite the upper surface.

In any prior method, the magnet is secured to the adhesive layer by a same actor that fired the substrate or by a different actor than fired the substrate.

Also disclosed in a magnetically controlled signal distribution device. The device can include a substrate and a screen printed low-k dielectric spacer over an upper surface of the surface, wherein the spacer is formed from a low-k dielectric paste and is directly on an upper surface of the substrate. The device also includes an adhesive layer on top of the spacer and a magnet secured to a top of the adhesive layer.

According to any device disclosed herein, the substrate can include metal traces formed on the upper surface of the substrate.

According to any device disclosed herein, the low-k dielectric spacer can be screen printed directly on top of the metal traces.

According to any device disclosed herein, the substrate can include a ground plane on a side opposite the upper surface.

Additional features and advantages are realized through the techniques of the present disclosure. Other embodiments and aspects are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be appreciated that an active electronically scanned way (AESA) antenna requires a circulator and/or isolators connected to each radiating element. The circulator duplexes the signals from the antenna, routing the transmit signal to the radiating element and the receive signal from the radiating element, while providing isolation between the transmit path and the receive path. An isolator, as described above, is a special circulator where one port of a three-port circulator is terminated in a matched load and results in a device that a signal can travel in only one direction between the remaining ports and may be used to shield equipment on its input side from the effects of conditions on its output side.

Herein the term "magnetically controlled signal distribution device" shall include devices that utilize a magnet to control the RF or microwave frequencies and includes, but is not limited to, isolators and circulators. In such magnetically controlled signal distribution devices, spacers act as another control point—in addition to magnet thickness and strength—and allow for adjustment of the field intensity and the magnetic field spread over the substrate.

Embodiments herein provide for forming such distribution devices with an integrated low K dielectric spacer applied in an array through screen printing technology. The spacer is applied in an array by screen printing low K dielectric material onto the device at the wafer level before device assembly. As discussed below, such embodiments may allow for spacers to be applied in an array at the wafer fabrication level, rather than one at a time at the device assembly level and, thus, saving on cost/processing time.

Figure 1:
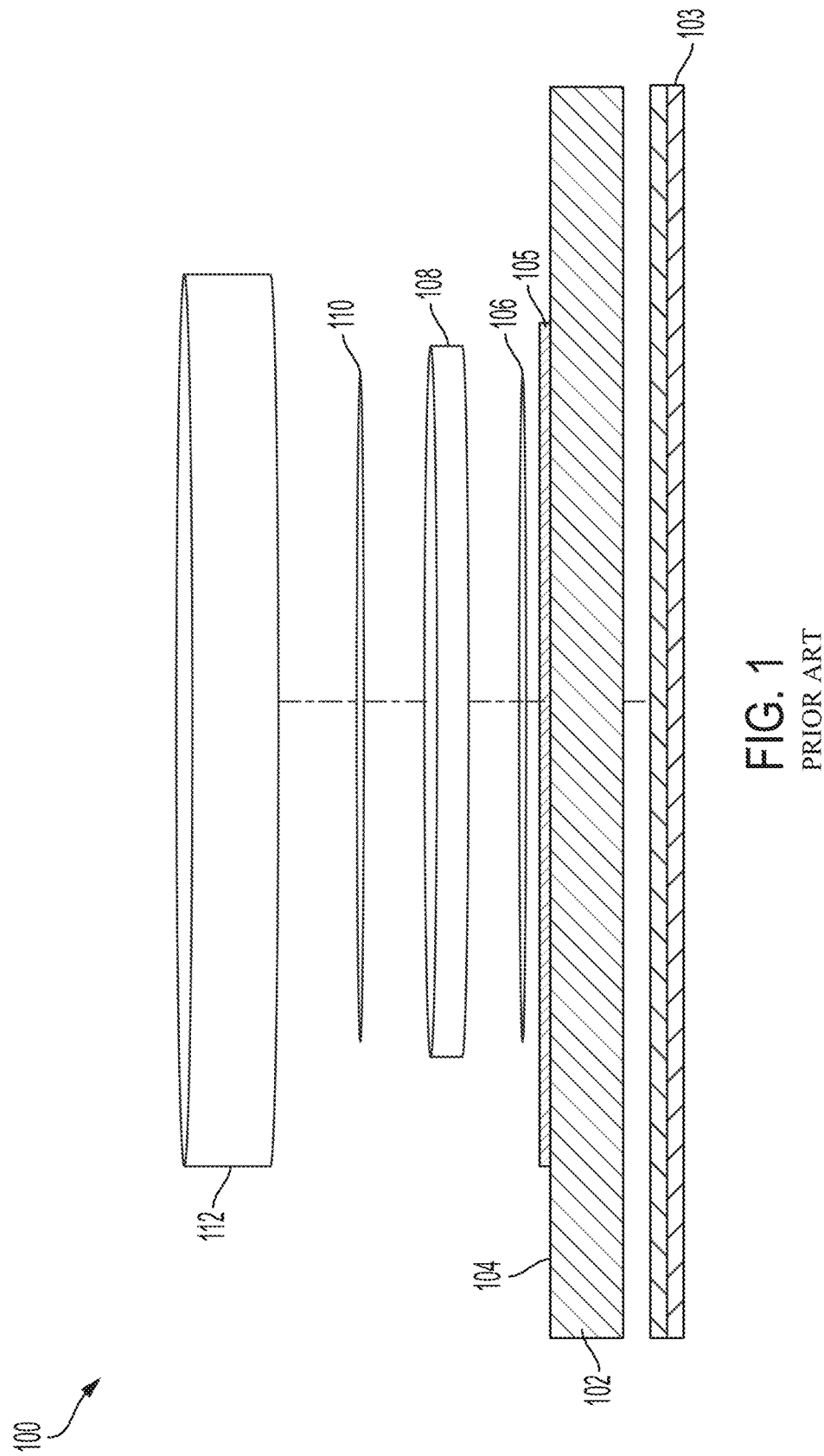
FIG. 1 is an exploded view of relevant layers of a magnetically controlled signal distribution device constructed according to prior methodology.

Further, embodiments can reduce the number of components in the device assembly. In addition, applying spacers using screen printing technology allows for more uniform thickness and tighter control of tolerance. This allows for better control of magnetic field and field spread over the device. In addition, improved device reliability can be achieved because, in embodiments, the epoxy to substrate interaction is eliminated and replaced with a sintered glass bond between the spacer material and substrate By way of background, reference is made to FIG. 1. In FIG. 1 an exploded view of prior art magnetically controlled signal distribution device 100 is illustrated. Such devices, generally, are composed of a ferrite substrate 102 with a magnet 112 mounted on top of patterned metallization. Such a device is made by formatting the substrate 102 so that it includes metal traces 105 on its upper surface 104 and a ground place 103 on its other surface.

The device 100 includes and a spacer 108. The spacer 108 is composed of a low dielectric constant material and is mounted between the magnet 112 and the substrate 102. The purpose of the spacer 108 is to control the strength of the magnet, spread of the magnetic field, define RF bandwidth, and to isolate the magnet from the conductive circuit pattern. Properties of the spacer 108 include thickness and dielectric constant. The lower the dielectric constant, the thinner the required spacer 108. The uniformity of the spacer thickness also improves the uniformity of the magnetic field. The spacer 108 thickness is selected based on magnet 112 size and strength to control the magnetic field and field spread over the substrate 102. In general, as the frequency range of the circulator increases, the size of the components decreases, and vice versa.

Referring back to FIG. 1, portions of the traces can have a first epoxy 106 deposited on them and then then the spacer 108 is placed on top of the first epoxy layer 106. A second epoxy layer 110 can be formed on top of the spacer 108 to secure the magnet 112 thereto.

The existing design of attaching the spacer 108 occurs at the device assembly stage, rather than at substrate fabrication. That is, the spacer 108 is a separate component and is attached to the substrate 102 one magnetically controlled signal distribution device (e.g., circulator) at a time. Further, as illustrated, the existing design also uses two epoxy layers 106,110 during assembly to secure the spacer 108 to the substrate 102 and the magnet 112 to the spacer 108. This "pick and place" process can be done on wafer layer or, more likely, after the wafer has been diced.

Figure 2:
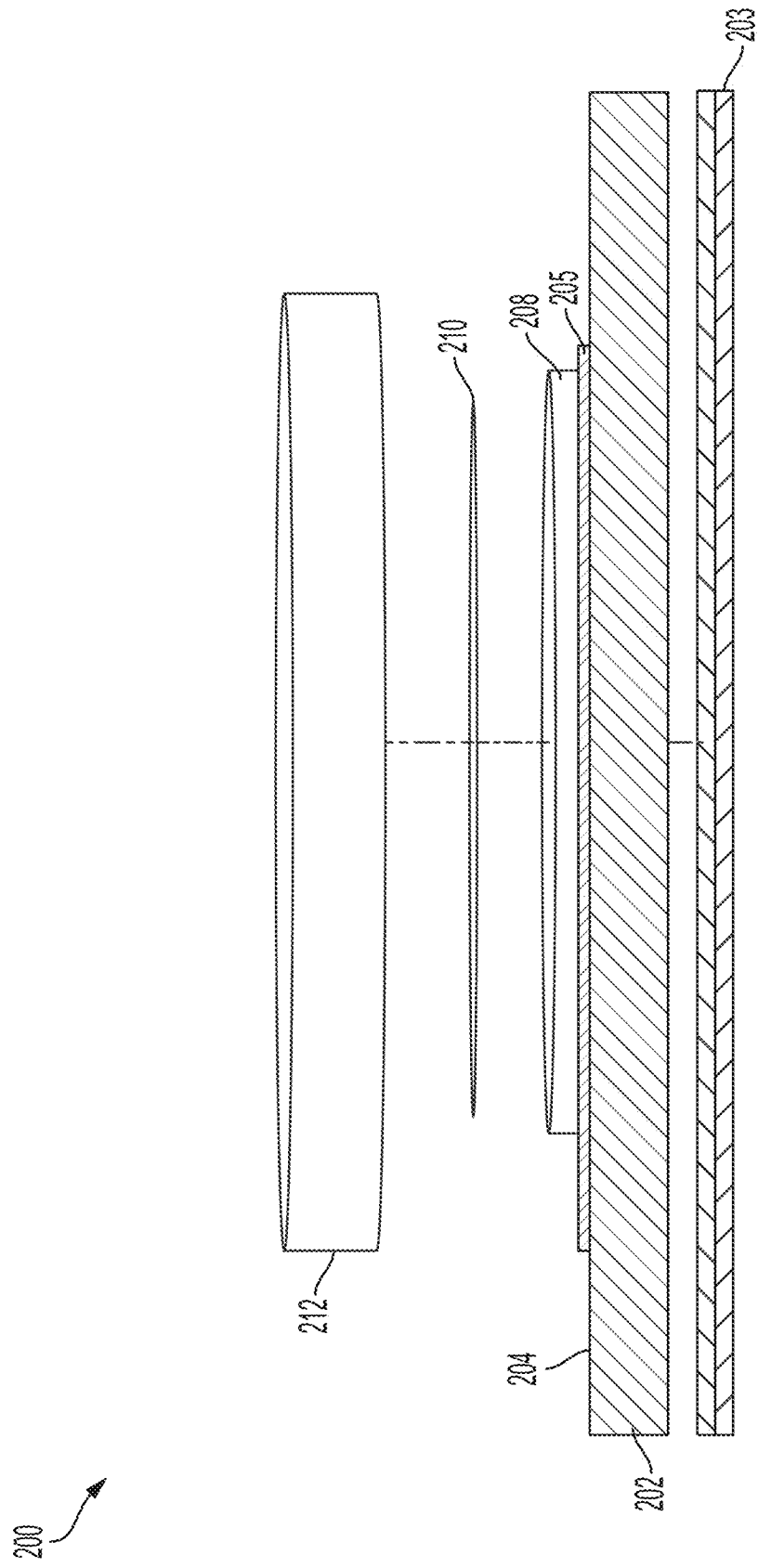
FIG. 2 is an exploded view of relevant layers of a magnetically controlled signal distribution device constructed according to one embodiment.

FIG. 2 shows an exploded view of magnetically controlled signal distribution device 200 according to one embodiment. The device 200 can be, for example, a circulator or isolator.

The device includes a substrate 202. In the present discussion, it shall be assumed that the substrate 202 forms a wafer that will have multiple devices formed from it and that is then diced to form discrete devices.

The substrate 200 can be formed of or include a ferrite in embodiment. In one embodiment, the substrate 202 is formed of garnet. The substrate 202 can include a ground plane 203 on one side of it. Similar to the above, the substrate 202 has a magnet 212 mounted on it and that is separated from the upper surface 204 of the substrate 202 by a spacer 206. However, as compared to FIG. 1, in FIG. 2 the structure 200 varies in at least two manners. First, the manner in which the spacer 206 is provided is different and second, it may (but is not required to) omit a layer of epoxy between the spacer 206 and the substrate 202.

To provide wideband magnetically controlled signal distribution device with a bandwidth greater than 2:1, composite ferrite substrates can be used. These substrates include a center disc of one ferrite material having a high saturation magnetization material and a ring of another ferrite material having a lower saturation magnetization material surrounding the center disc, and a thermally matched dielectric ceramic material surrounding the ferrite materials. It should be noted that the low saturation magnetization material could also be used instead of the thermally matched dielectric ceramic material as a single element. The processes employed in this disclosure are compatible with the usage of the composite ferrite substrates.

In more detail, the spacer 206 in FIG. 2 can be screen printed on to the upper surface 204 of the substrate 202. The process can occur after one or more traces 205 are formed on the upper surface 204.

The traces 205 can be formed by conventional means including forming a metallization layer on the upper surface 204 of the substrate 202 and then utilizing a photoresist etch to remove unwanted portions of the layer to leave the desired traces. In one embodiment, the substrate can be formed by one party such that it includes the traces thereon. The following processing can be performed by the same party or by one or more additional parties. Thus, different embodiments can have different steps performed by different parties based on the stage of process.

Herein, a party includes a semiconductor processing location. For example, some parts of the processing could be done at a first processing location (first party) and other steps could be done at another processing location (second party). As a specific example, the process could include receiving a wafer that either includes the traces already formed on it or just receiving the wafer and then adding the traces. As another a specific example, a wafer could be formed at one location and then diced at another.

Figure 3:
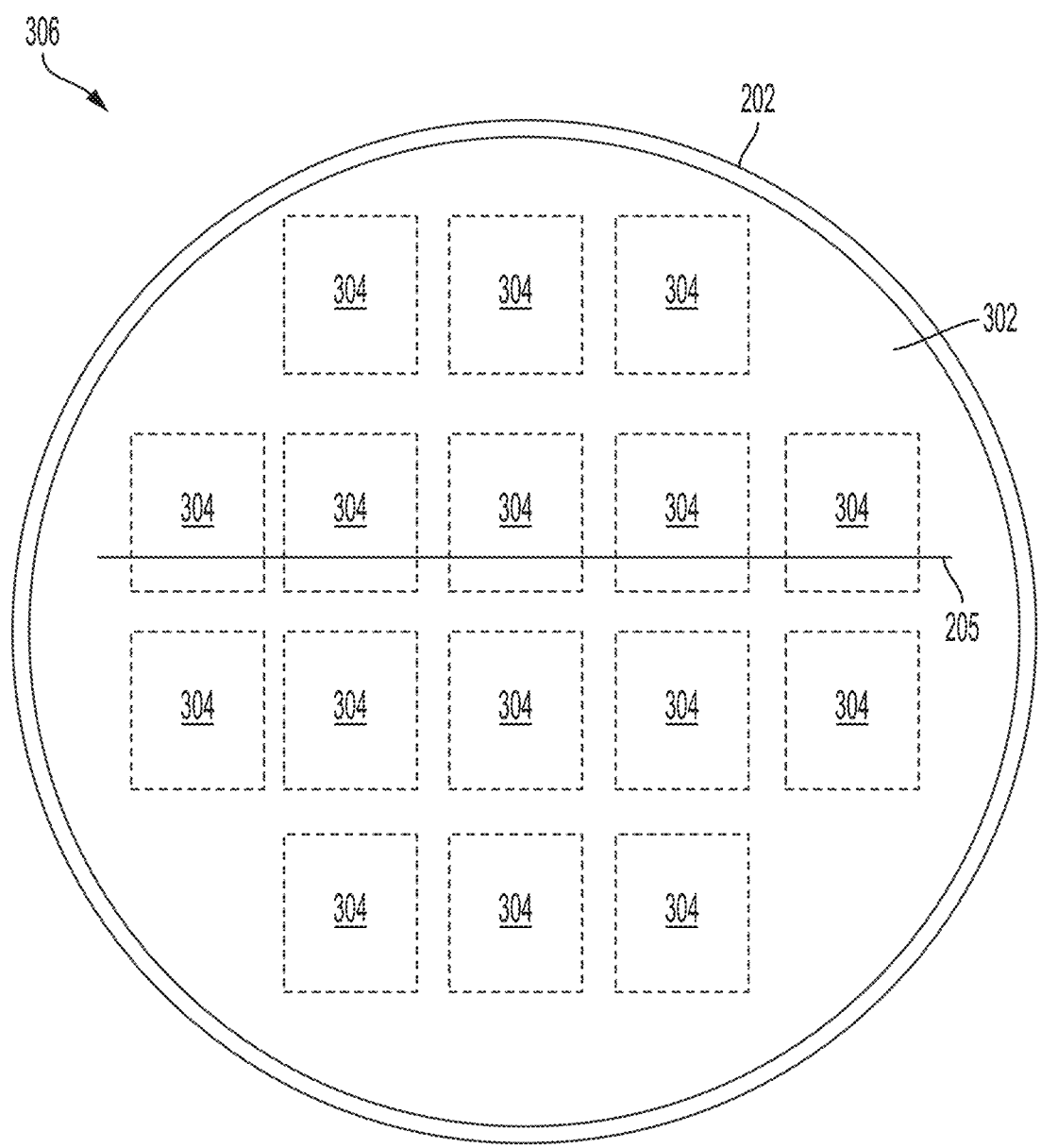
FIG. 3 is top view of wafer including a screen print template.

As shown in FIG. 3, a screen 302 can be provided over a wafer 306 that includes the substrate 202 and one or more traces 205 formed thereon. In one embodiment, a low-k dielectric is applied in the form of thick film by using a screen printing technique that utilizes the screen 302 to precisely locate the spacer 208. A low k dielectric is one that has a dielectric constant (k) of below 5.

The resulting substrate device including the substrate 202 and the spacer 208 is then fired as a unit. This results in formation of a thick film dielectric glass spacer 208 that bonds to the substrate 202. The bond can be direct with no materials between them in one embodiment. Improved reliability can be realized because (in contrast to FIG. 1) the epoxy 106 to substrate 102 interaction is eliminated and replaced with a sintered glass bond between the spacer 208 material and substrate, 202.

Such firing can include firing the substrate 202/spacer 206 combination at about 850 degrees C.

Operating in this manner allows for the spacer 208 to be in an array at the wafer fabrication level, rather than one at a time at the device assembly level as in the prior art. This saves on cost of the device and reduces processing time. Further, applying spacers 208 using screen printing technology allows for more uniform thickness across the spacers for all devices on the wafer 306 and, thus, tighter control of tolerance resulting in better control of magnetic field and field spread over each individual the device.

Referring back to FIG. 2, the device 200 includes an adhesive layer 210 formed on top of the spacer 208 to secure the magnet 212 thereto. The adhesive and magnet 212 can be applied at the wafer level or after the wafer has been diced.

In one embodiment, the adhesive layer 210 is formed of epoxy. The adhesive layer 210 will bond the magnet to the spacer 208.

The existing design of attaching the spacer 108 occurs at the device assembly, rather than at substrate fabrication. That is, the spacer 108 is a separate component and is attached to the substrate 102 one magnetically controlled signal distribution The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A magnetically controlled signal distribution device comprising:
   a substrate having an upper surface;
   a screen printed low-k dielectric spacer over the upper surface of the substrate, wherein the spacer is formed from a low-k dielectric paste and is directly on the upper surface of the substrate;
   an adhesive layer on top of the spacer; and
   a magnet secured to a top of the adhesive layer.

2. The device of claim 1, wherein the substrate includes metal traces formed on the upper surface of the substrate.

3. The device of claim 2, wherein the low-k dielectric spacer is directly on top of the metal traces.

4. The method of claim 1, wherein the low-k dielectric spacer is screen printed directly on top of the upper surface.

5. The device of claim 1, wherein the substrate includes a ground plane on a side opposite the upper surface.

6. The device of claim 5, wherein the substrate is a wafer.

* * * * *